A. NEER.
Dumping-Wagon.

No. 64,350. Patented Apr. 30, 1867.

Witnesses
F. A. Jackson
Theo Fusche

Inventor
Adam Neer
Per Munn & Co
Attorneys

United States Patent Office.

ADAM NEER, OF BELLEFONTAINE, OHIO.

Letters Patent No. 64,350, dated April 30, 1867.

---

IMPROVEMENT IN GRAVEL WAGON.

---

The Schedule referred to in these Letters Patent and making part of the same.

---

TO ALL WHOM IT MAY CONCERN:

Be it known that I, ADAM NEER, of Bellefontaine, in the county of Logan, and State of Ohio, have invented a new and useful Improvement in Gravel Wagon; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention consists in so constructing the box and frame of a wagon that the box can be run back to dump the load, and again drawn forward by ropes operated by cranks and reels, as hereinafter more fully described.

Figure 2:
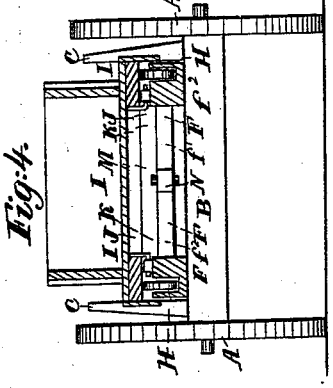
Figure 2 is a side view of the same, partly in section through the line y y, fig. 3.
Figure 4:
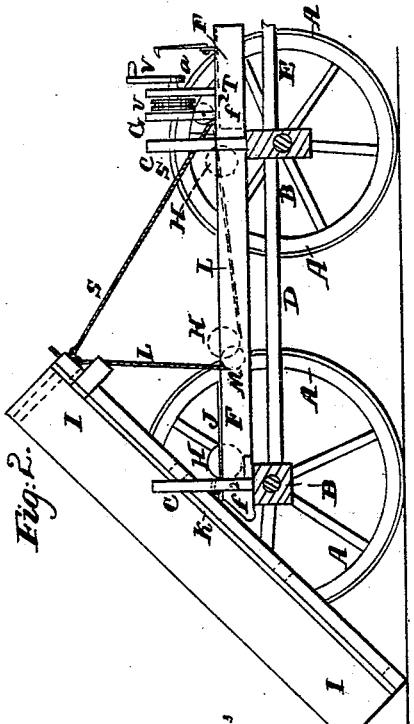
Figure 4 is a vertical cross-section of the same, taken through the line z z, fig. 1.
Figure 1:
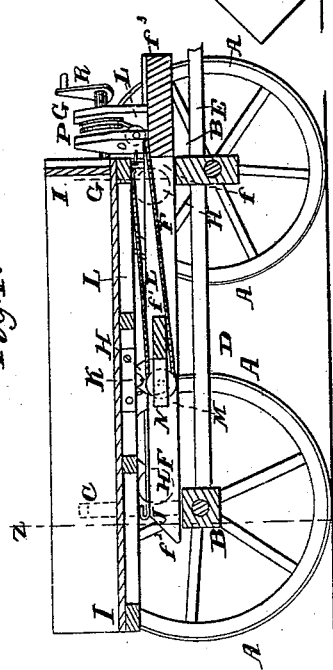
Figure 1 is a vertical longitudinal section of my improved wagon taken through the line x x, fig. 3.
Figure 3:
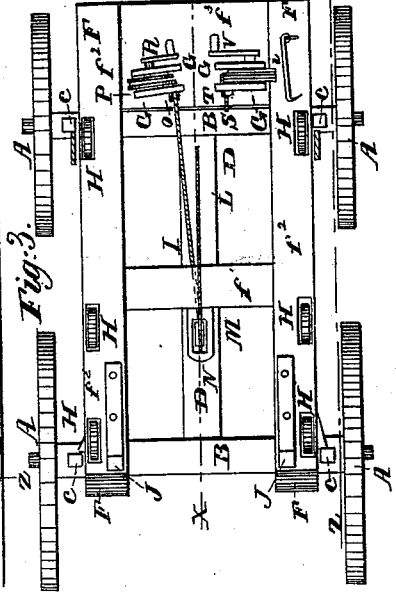
Figure 3 is a top view of the same, the box being removed.

A are the wheels; B are the axles; C the stakes; D the reach; and E the tongue of the wagon; about the construction of which parts there is nothing new. F is a frame resting upon the axles or bolsters of the wagon. $f^1$ is a cross-bar connecting the middle parts, $f^2$, of the frame F. The forward ends of the side-pieces $f^2$ are connected by the platform $f^3$, which, at the same time, also supports the uprights G, and furnishes a place for the driver to stand upon when unloading the wagon. H are rollers pivoted in the side-pieces $f^2$ of the frame F, above the upper surface of which they project for the box I to roll back and forth upon. J are hooks attached to the upper side of the rear end of the side-pieces $f^2$ of the frame F, as shown in figs. 1 and 3. K are arms or pins attached to the middle part of the frame of the box I, and projecting down in such a way that when the box I is drawn back to unload, they may enter the hooks J, and thus pivot the box I to the frame F, as shown in fig. 2. L is a rope, one end of which is attached to the under side of the forward end of the box I; it passes thence around the pulley M, pivoted in a block, N, attached to the rear side of the cross-bar $f^1$ of the frame F; thence it passes forward around the pulley O, pivoted in the lower part of the upright G, and its end is attached to the reel or drum P, which is operated by the crank R. When the box I is in the position shown in fig. 1, by turning the crank R the box I is drawn back till the arms or pins K enter the hooks J, and the load is dumped, the box I taking the position shown in fig. 2. S is a rope, one end of which is attached to the under side of the forward end of the box I, thence it passes around the pulley T, pivoted in the lower part of the upright G, and its other end is attached to the reel or drum U, which is operated by the crank V. When the box I is in the position shown in fig. 2, by turning the crank V the rope S will be wound upon the reel U, drawing the forward end of the box I down, and the box forward into the position shown in fig. 1, ready to receive another load. It will be observed that as one of the ropes, L or S, is wound upon its reel to draw the box I in either direction, the other rope is, at the same time, unwound from the other reel, thus keeping both the ropes always taut. W is a hook attached to the forward end of the frame F, and which hooks into a staple or eye, X, attached to the forward end of the box I, to keep the said box in place while passing over rough or uneven ground. If desired, a seat for the driver may be attached to the forward end of the box I.

What I claim as new, and desire to secure by Letters Patent, is—

1. The combination of the rope L, pulleys M and O, reel or drum P, and crank R, with each other, and with the box I and frame F, substantially as herein shown and described, and for the purpose set forth.

2. The combination of the rope S, pulley T, reel or drum U, and crank V, with each other, and with the box I and frame F, substantially as herein shown and described, and for the purpose set forth.

ADAM NEER.

Witnesses:
 PHILANDER JONES,
 JOHN SHURR.